(12) United States Patent  (10) Patent No.: US 7,827,957 B2
Ishikawa  (45) Date of Patent: Nov. 9, 2010

(54) DIESEL ENGINE CONTROL DEVICE

(75) Inventor: Naoya Ishikawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 856 days.

(21) Appl. No.: 11/664,634

(22) PCT Filed: Oct. 4, 2005

(86) PCT No.: PCT/JP2005/018315

§ 371 (c)(1),
(2), (4) Date: Apr. 4, 2007

(87) PCT Pub. No.: WO2006/038600

PCT Pub. Date: Apr. 13, 2006

(65) Prior Publication Data

US 2008/0221780 A1  Sep. 11, 2008

(30) Foreign Application Priority Data

Oct. 6, 2004  (JP) .............................. 2004-293964

(51) Int. Cl.
*F02B 3/00* (2006.01)
(52) U.S. Cl. .................. 123/299; 123/294; 123/300
(58) Field of Classification Search .................. 123/294, 123/299, 300, 305, 434
See application file for complete search history.

(56) References Cited

U.S. PATENT DOCUMENTS

| 5,186,139 | A * | 2/1993 | Matsura ...................... 123/301 |
| 2003/0217732 | A1 | 11/2003 | Kataoka et al. ............. 123/276 |
| 2004/0154582 | A1 | 8/2004 | Shimazaki .................. 123/299 |

FOREIGN PATENT DOCUMENTS

| EP | 0 924 416 A2 | 12/1998 |
| EP | 0 952 323 A2 | 4/1999 |
| EP | 1 515 033 A2 | 8/2004 |

(Continued)

OTHER PUBLICATIONS

Search Report for Serial No. EP 05 79 0497 dated Dec. 1, 2008.

(Continued)

*Primary Examiner*—Stephen K Cronin
*Assistant Examiner*—J. Page Hufty
(74) *Attorney, Agent, or Firm*—McCormick, Paulding & Huber LLP

(57) ABSTRACT

A control device is provided that controls the injection quantity and injection timing of fuel injected into the cylinder of a diesel engine, in which are provided two control modes of: a normal injection mode in which the injection quantity and injection timing are controlled so that the injected fuel ignites near compression top dead center during an injection period; and a premixed injection mode in which the injection quantity and injection timing are controlled so that fuel injection is completed before compression top dead center and the injected fuel ignites near compression top dead center after a premixing period, and target values of control parameters (pilot injection timing, and the like) are set in advance separately for each control mode, the control device comprising change means for gradually changing target values V1 of one control mode into the target values V2 of the other control mode when switching from one control mode to the other control mode.

9 Claims, 10 Drawing Sheets

FOREIGN PATENT DOCUMENTS

| | | |
|---|---|---|
| EP | 1 538 325 A1 | 6/2005 |
| JP | 11-324764 | 11/1999 |
| JP | 2000-34944 | 2/2000 |
| JP | 2003-286879 | 10/2003 |
| JP | 2003-286880 | 10/2003 |
| JP | 2004-100566 | 4/2004 |
| JP | 2004-116466 | 4/2004 |
| JP | 2004-124732 | 4/2004 |
| JP | 2004-239208 | 8/2004 |

OTHER PUBLICATIONS

Search Report for PCT/JP2005/ 018315 dated Nov. 25, 2005.

* cited by examiner

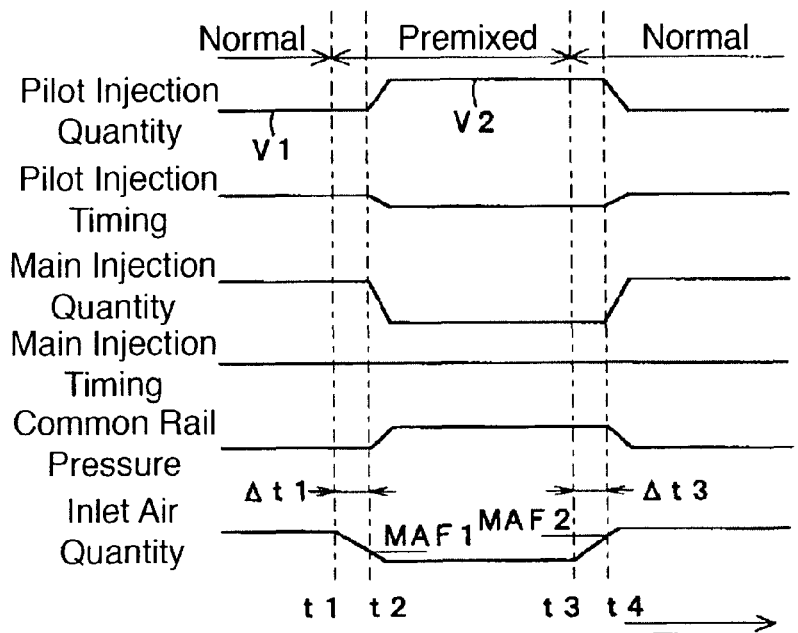
FIG. 7
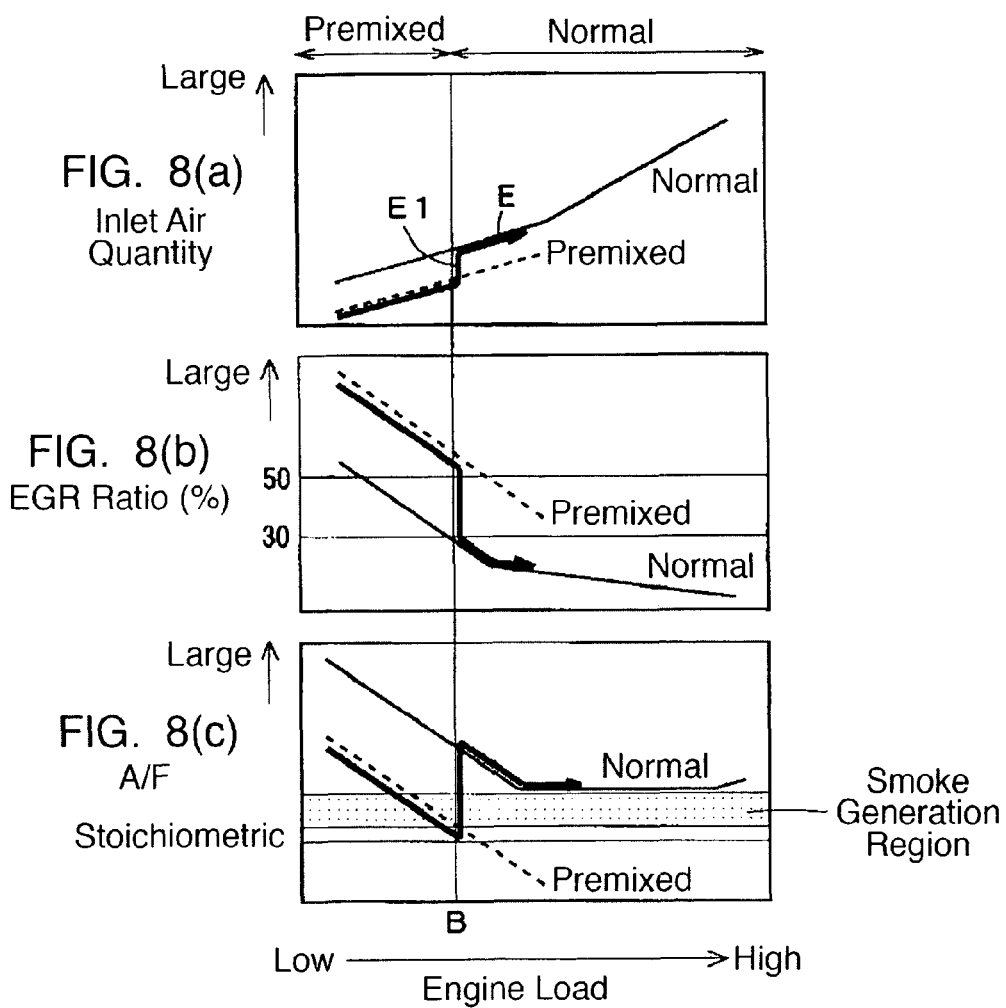
FIG. 8(a) Inlet Air Quantity
FIG. 8(b) EGR Ratio (%)
FIG. 8(c) A/F

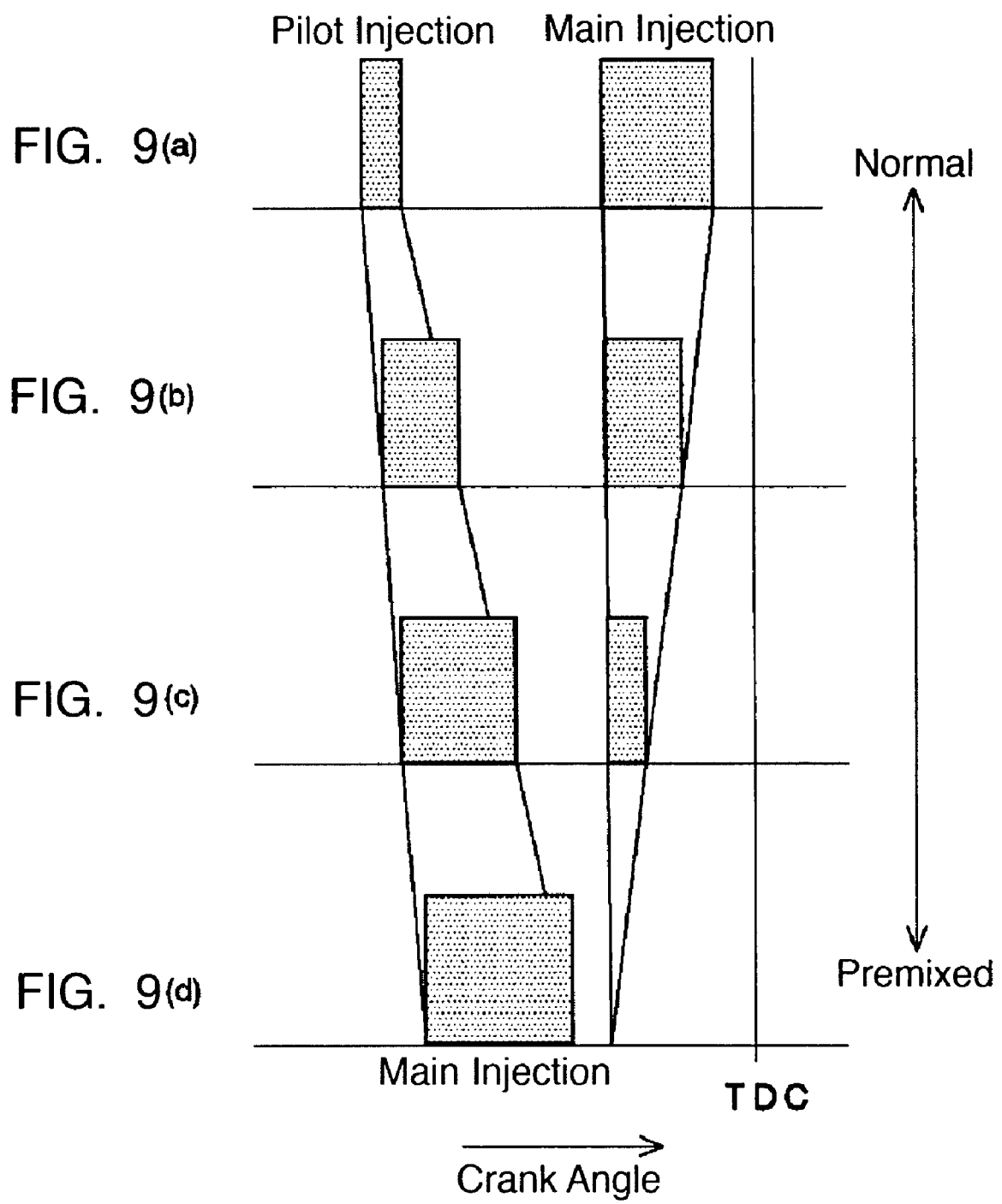

DIESEL ENGINE CONTROL DEVICE

CROSS REFERENCE TO RELATED APPLICATIONS

This application is entitled to the benefit of and incorporates by reference essential subject matter disclosed in International Patent Application No. PCT/JP2005/018315 filed on Oct. 4, 2005 and Japanese Patent Application No. 2004-293964 filed Oct. 6, 2004.

TECHNICAL FIELD

The present invention relates to a diesel engine control device, and more particularly to a diesel engine control device that implements control of switching between normal diffuse combustion and premixed compression ignition combustion.

BACKGROUND OF THE INVENTION

In diesel engines that directly inject fuel into the cylinders, the fuel was normally injected near the piston compression top dead center when there was high temperature and high pressure within the cylinder. In this case, ignition started and flames were formed while the fuel was being injected, and combustion continued by supplying subsequent fuel to the flames. Combustion of this form in which ignition starts during injection of the fuel in this way is normally known as diffuse combustion (hereafter also referred to as normal combustion), but this diffuse combustion has the problem that there is a limit to the reduction of NOx, smoke, and the like.

Therefore, in recent years, a form of combustion that is known as premixed compression ignition combustion (hereafter also referred to as premixed combustion) has been proposed to be realized in which the fuel injection or supply period is earlier than piston compression top dead center, and after fuel supply is completed, the premixed fuel-air mixture ignites (see Patent Documents 1, 2).

In premixed combustion, the premixed fuel-air mixture ignites after a certain period (premixed period) has passed after completion of fuel injection, so the premixed fuel-air mixture has sufficiently diluted and homogenized by the time ignition occurs. Therefore, the local combustion temperature is reduced, the quantity of NOx emissions is reduced, and combustion under insufficient air is avoided, so smoke generation is also reduced.

Patent Document 1: Japanese Patent Application Laid-open No. H11-324764

Patent Document 2: Japanese Patent Application Laid-open No. 2003-286880

SUMMARY OF THE INVENTION

Premixed combustion is a form of combustion that is realized for the first time when uniform dilution of the premixed fuel-air mixture is obtained, and requires a comparatively high excess air ratio within the cylinder. At least at present, premixed combustion can only be implemented under the limited operating conditions of the low load region. Therefore in the high load region, it is necessary to implement normal diffuse combustion, and it is necessary to switch between premixed combustion and diffuse combustion according to the operating conditions. Also, if this switching is not properly carried out, combustion noise and torque fluctuations will be generated.

Therefore, it is an object of the present invention to provide a diesel engine control device that is capable of carrying out smoothly and properly the switching between premixed combustion and diffuse combustion.

According to a first aspect of the present invention, a diesel engine control device is provided that controls the injection quantity and injection timing of fuel injected into the cylinder of a diesel engine wherein are provided two control modes: a normal injection mode in which the injection quantity and injection timing are controlled so that the injected fuel ignites near compression top dead center during the injection period; and a premixed injection mode in which the injection quantity and injection timing are controlled so that fuel injection is completed before compression top dead center and the injected fuel ignites near compression top dead center after a premixing period, and target values of control parameters are set in advance separately for each control mode, the diesel engine control device comprising change means for gradually changing the target values of one control mode into the target values of the other control mode when switching from one control mode to the other control mode.

Preferably, the diesel engine control device comprises: an EGR device that implements EGR to recirculate a part of the exhaust gas to the gas inlet side, and that includes a valve to change the EGR ratio; and EGR control means that controls the valve so that the actual EGR ratio approaches the target EGR ratio, wherein the target values include at least the target fuel injection quantity, the target fuel injection timing, and the target EGR ratio, and the change means has delay means that starts to change the target fuel injection quantity and the target fuel injection timing after starting to change the target EGR ratio when switching from one control mode to the other control mode.

The valve may include at least an inlet air throttle valve provided in an engine inlet air passage, the EGR control means may control the inlet air quantity to control the EGR ratio, and may control at least the inlet air throttle valve so that the actual inlet air quantity approaches the target inlet air quantity, and the delay means starts to change the target fuel injection quantity and the target fuel injection timing after starting to change the target inlet air quantity when switching from one control mode to the other control mode.

Preferably, in the premixed injection mode, the target EGR ratio is set to 50% or greater.

Preferably, means is provided to correct the target EGR ratio based on the engine temperature.

Preferably, the diesel engine control device comprises a common rail that stores the fuel before injection under high pressure and means to control the common rail pressure which is the pressure of the fuel within the common rail, the target values further include the target common rail pressure, and the delay means further starts to change the target common rail pressure after starting to change the target EGR ratio when switching from one control mode to the other control mode.

Preferably, in the normal injection mode, a small quantity pilot injection and a large quantity main injection are carried out; and in the premixed injection mode, only a main injection is carried out; the target values include at least the target pilot injection quantity, the target pilot injection timing, the target main injection quantity, and the target main injection timing in the normal injection mode, as well as the target main injection quantity and the target main injection timing in the premixed injection mode; the target pilot injection quantity and the target pilot injection timing in the normal injection mode are associated with the target main injection quantity and the target main injection timing in the premixed injection mode respectively; and when switching from one control mode to the other control mode, the change means gradually changes between the target pilot injection quantity in the normal injection mode and the target main injection quantity in the premixed injection mode, and gradually changes between the target pilot injection timing in the normal injection mode and the target main injection timing in the premixed injection mode.

Preferably, means for correcting the target main injection timing in the premixed injection mode based on the engine temperature is provided.

Preferably, the normal injection mode is implemented under higher engine loads than the premixed injection mode.

Preferably, the engine comprises a reentrant type cavity provided in the top of a piston, and an injector whose injection angle is set so that the injected fuel enters the cavity in both control modes.

Also, according to a second aspect of the present invention, a diesel engine control device is provided that controls the injection quantity and injection timing of fuel injected into a cylinder of a diesel engine, wherein are provided two control modes of: a normal injection mode in which the injection quantity and injection timing are controlled so that the injected fuel ignites near compression top dead center during the injection period; and a premixed injection mode in which the injection quantity and injection timing are controlled so that fuel injection is completed before compression top dead center and the injected fuel ignites near compression top dead center after a premixing period, target values of control parameters for the fuel system and the gas inlet system are set in advance separately for each control mode, the diesel engine control device comprising change and delay means for, changing the target values of one control mode into the target values of the other control mode, and starting to change the target values of the fuel system in one control mode behind the change in target values of the air system in one control mode when switching from one control mode to the other control mode.

According to a third aspect of the present invention, a diesel engine control device is provided that controls the injection quantity and the injection timing of fuel injected into the cylinders of a diesel engine, wherein are provided two control modes: a normal injection mode in which the injection quantity and the injection timing are controlled so that the injected fuel ignites near compression top dead center during the injection period; and a premixed injection mode in which the injection quantity and injection timing are controlled so that fuel injection is completed before compression top dead center and the injected fuel ignites near compression top dead center after a premixing period; in the normal injection mode a small quantity pilot injection and a large quantity main injection are carried out, and in the premixed injection mode, only a main injection is carried out; target values of control parameters are set in advance separately for each control mode, the target values comprise at least the target pilot injection quantity, the target pilot injection timing, the target main injection quantity, and the target main injection timing in the normal injection mode, as well as the target main injection quantity and the target main injection timing in the premixed injection mode, and the target pilot injection quantity and the target pilot injection timing in the normal injection mode are associated with the target main injection quantity and the target main injection timing in the premixed injection mode respectively, the diesel engine control device comprising fuel target value change means for effecting changes between the target pilot injection quantity in the normal injection mode and the target main injection quantity in the premixed injection mode, as well as effecting changes between the target pilot injection timing in the normal injection mode and the target main injection timing in the premixed injection mode, when switching from one control mode to the other control mode.

According to the present invention, it is possible to obtain the superior effects that switching between premixed combustion and diffuse combustion can be carried out smoothly and properly and combustion noise and fluctuations in torque during switching can be prevented.

BRIEF DESCRIPTION OF THE DRAWINGS

FIG. 7 is a timing chart showing the variation in each target value when switching control modes.

FIG. 8 is a graph showing the variation in the values of the air intake system corresponding to variations in the engine load.

FIG. 9 is a timing chart showing the variation in injection quantity and injection timing when switching control modes.

BEST MODE FOR CARRYING OUT THE INVENTION

The following is a detailed description of the best mode for carrying out the invention based on the attached drawings.

Figure 1:
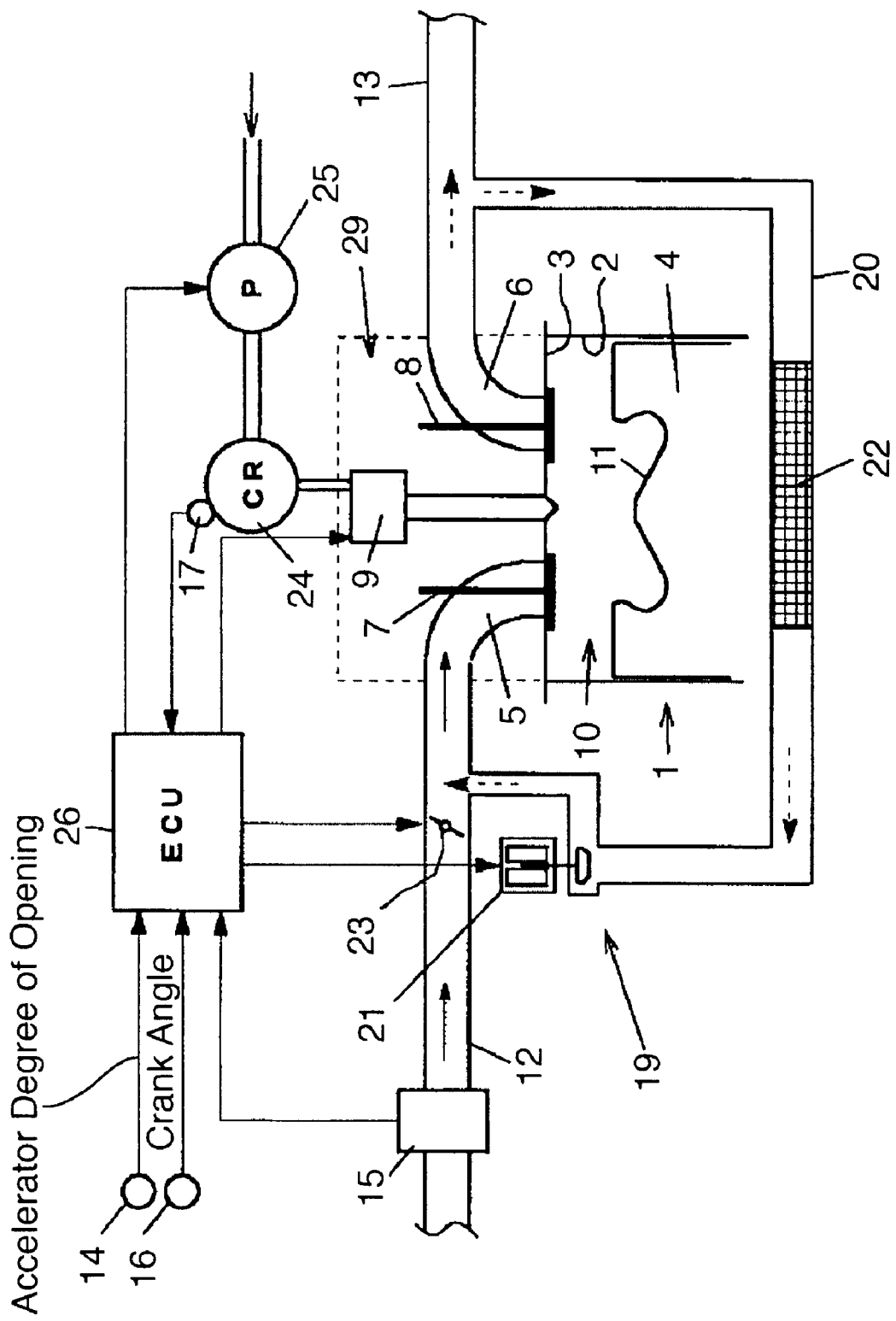
FIG. 1 is a schematic diagram of a diesel engine according to an embodiment of the present invention.

FIG. 1 shows a control device for a diesel engine (hereafter simply referred to as the engine) according to the present embodiment. FIG. 1 shows only one cylinder, but of course there may be many cylinders.

In the figure, 1 is the main engine body, which includes a cylinder 2, a cylinder head 3, a piston 4, an air inlet port 5, an exhaust port 6, an air inlet valve 7, an exhaust valve 8, and an injector 9, and so on. A combustion chamber 10 is formed by the space enclosed by the cylinder 2, the cylinder head 3, and the piston 4. A cavity 11 is formed as a depression in the top of the piston 4, and the injector 9 that is provided facing the combustion chamber 10 directly injects fuel towards the cavity 11.

The cavity 11 and the injector 9 of the engine according to the present embodiment are designed to be the same as those for a normal diesel engine designed on the assumption of realizing diffuse combustion.

Specifically, as shown in FIG. 2, the cavity 11 of the present embodiment is a reentrant cavity in which the area of the aperture (the top end portion) is formed smaller than the cross-sectional area of the parts below, and with a convex part that rises up formed in the center of the bottom of the cavity 11, the injector 9 is disposed substantially concentric with the cylinder 2 and injects fuel at a normal injection angle β (for example, within the range of 140° to 165°) from a plurality of injection holes.

Returning to FIG. 1, the injector 9 is connected to a common rail 24, and high pressure fuel that is stored in the common rail 24 is constantly supplied to the injector 9. A high pressure supply pump 25 supplies fuel under pressure to the common rail 24.

The air inlet port 5 is connected to an air inlet pipe 12, and these form the air inlet passage. The exhaust outlet port 6 is connected to an exhaust pipe 13, forming the exhaust passage.

The engine according to the present embodiment further includes an EGR device 19 to implement EGR that recirculates a part of the exhaust gas (the EGR gas) in the exhaust pipe 13 to the air inlet pipe 12.

The EGR device 19 includes an EGR pipe 20 that connects the inlet pipe 12 and the exhaust pipe 13, an EGR valve 21 that modifies the area of the passage of the EGR passage 20 to adjust the EGR ratio, and an EGR cooler 22 that cools the EGR gas at the upstream of the EGR valve 21. By increasing the degree of opening of the EGR valve 21, the EGR ratio and EGR quantity of the inlet gas inlet in the cylinder can be increased, and conversely by reducing the degree of opening of the EGR valve 21, the EGR ratio and EGR quantity of the inlet gas can be reduced.

An inlet air throttle valve 23 is provided in the inlet pipe 12 upstream of the connection with the EGR pipe 20 to throttle the inlet air as appropriate. The inlet air throttle valve 23 is also included in the EGR device 19. By opening and closing the inlet air throttle valve 23, the quantity or percentage of inlet air (new air) as a percentage of the total inlet gas can be adjusted, so the EGR ratio can be adjusted. In other words, by increasing the valve degree of opening of the inlet air throttle valve 23, the quantity (percentage) of inlet air is increased, and the EGR ratio and EGR quantity of the inlet gas can be reduced. Conversely, by reducing the valve degree of opening of the inlet air throttle valve 23, the quantity of inlet air is reduced, and the EGR ratio and EGR quantity of the inlet gas can be increased.

An electronic control unit (hereafter referred to as the ECU) 26 is provided for electronic control of the engine. The ECU 26 (control device) reads the operating conditions of the engine from many types of sensors, and based on the engine operating conditions controls the injector 9, the EGR valve 21, the inlet air throttle valve 23, and so on. These sensors include an accelerator degree of opening sensor 14 that detects the degree of opening of the accelerator, a crank angle sensor 16 that detects the phase of the crankshaft (not shown in the drawings) of the engine, in other words crank angle, a common rail pressure sensor 17 that detects the fuel pressure in the common rail 24, an inlet air quantity sensor 15 that detects the inlet air quantity, and so on, and based on the output signals from each of these sensors, the ECU 26 determines the actual accelerator degree of opening, crankshaft angle, common rail pressure, inlet air quantity, and so on. In particular, the ECU 26 determines the engine load L based on the value of accelerator degree of opening, calculates the rate of increase in the crank angle with respect to time and determines the engine rotation speed NE.

The ECU 26 turns the injector 9 ON or OFF, so that the injector 9 executes or stops fuel injection. The ECU 26 determines the target values of fuel injection quantity and fuel injection timing based on parameters representing the operating conditions of the engine detected by the sensors, in particular the detected values of the engine rotation speed NE and the engine load L, and when the actual crank angle reaches the target injection timing, the injector 9 is turned ON from that timing for a period of time corresponding to the target injection quantity. In other words, the injection quantity corresponds to the electrification time of the injector, and the injection timing is the injector electrification start timing, in other words the injection start timing. The target injection quantity and target injection timing are determined in advance through actual tests or similar, and the values are stored in the memory within the ECU 26 in map form.

Feedback control is also carried out for the common rail pressure, namely, the injection pressure. In other words, the ECU 26 determines the target value of common rail pressure from the maps recorded in advance, based on parameters representing the operating conditions of the engine detected by the sensors, in particular the detected values of the engine rotation speed NE and the engine load L, and controls the degree of opening of an adjustment valve that is not shown in the drawings to control the fuel supply quantity to the common rail 24 from the high pressure supply pump 25 so that the actual common rail pressure approaches the target value.

Figure 3:
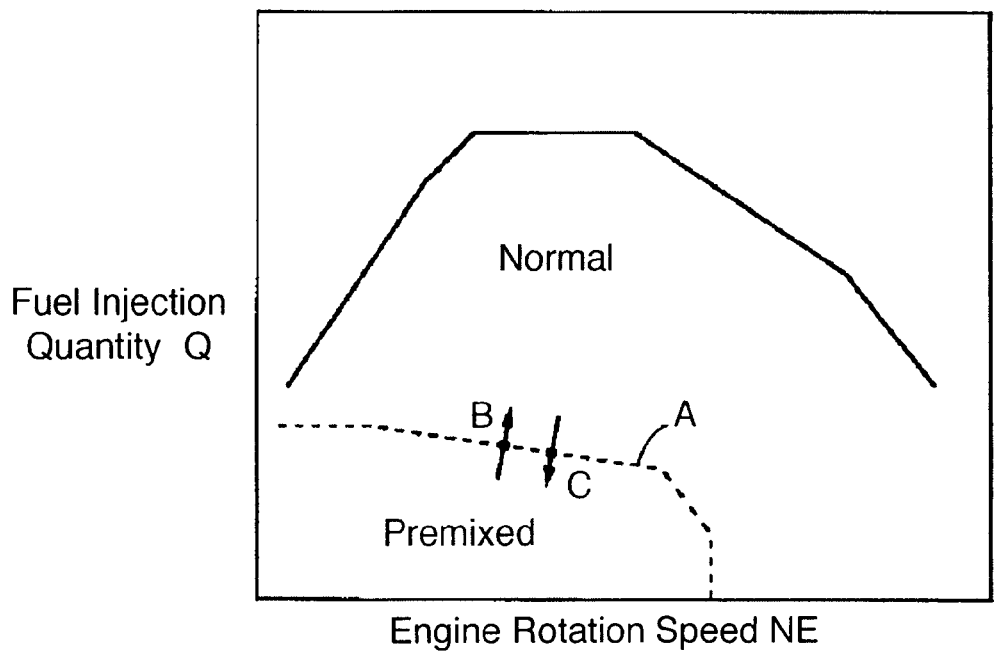
FIG. 3 is a map showing the premixed region and the normal region among the engine operating regions.

The engine according to the present embodiment implements premixed combustion in a predetermined operating region as explained in the section "Background Art", and in other operating regions, implements normal diffuse combustion. Specifically, as shown in FIG. 3, the region in which premixed combustion is implemented (premixed region) and the region in which normal diffuse combustion is implemented (normal region) are determined in advance on an engine operating region map determined on the engine rotation speed NE and the fuel injection quantity Q, and a switching line A that defines the boundary of these regions is determined in advance. The premixed region is set on the low load side of the normal region.

Also, the control device according to the present embodiment has two control modes: a premixed injection mode that is implemented in the premixed region, and a normal injection mode that is implemented in the normal region. When the actual engine rotation speed NE and the fuel injection quantity Q are in the premixed region (in other words, on the low load side of the switching line A), control is implemented according to the premixed injection mode, and when they are in the normal region (in other words, on the high load side of the switching line A), control is implemented according to the normal injection mode. If, during engine operation, the operating conditions change from the premixed region to the normal region or vice versa, the control mode is also switched accordingly at the points B and C respectively, which are shown in the drawing. This will be explained in detail later.

As stated above, the engine according to the present embodiment implements the premixed combustion using the reentrant type cavity 11 and the injector 9 having a normal injection angle β. In the premixed region, the ECU 26 controls the fuel injection start timing so that fuel injection is completed before compression top dead center of the piston 4, and so that all the injected fuel enters the cavity 11. This injection timing is for example within the range of 5 to 35° before top dead center. In other words, the fuel injection timing is advanced to be earlier than that of normal combustion, but the range of the advance angle is limited to that range for which all the injected fuel will enter the cavity 11.

Here, a more detailed explanation of the injection timing (injection start timing) is provided based on FIG. 2.

Figure 2A:
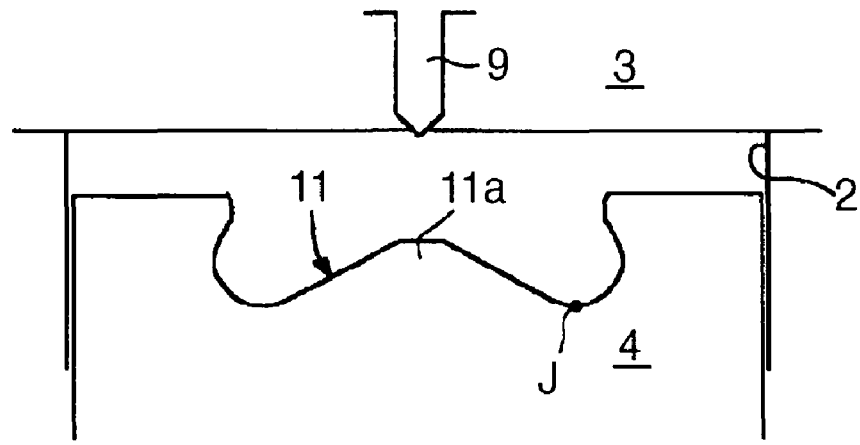
FIG. 2 is a diagram showing the relationship between fuel injected from the injector and the piston.
Figure 2B:
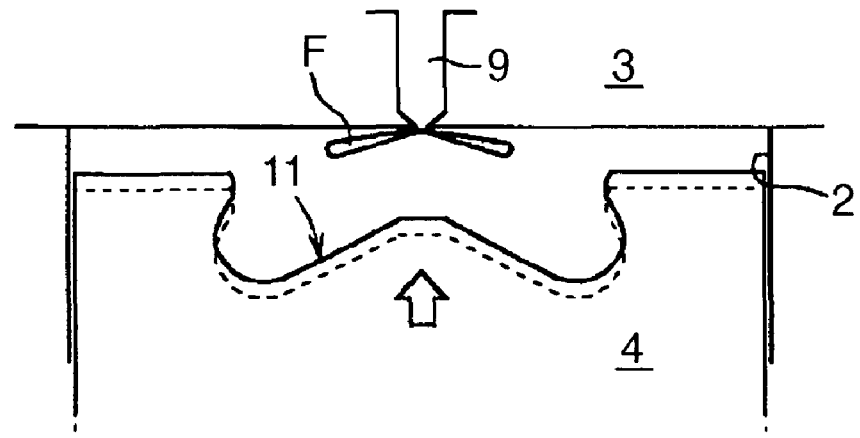
Figure 2C:
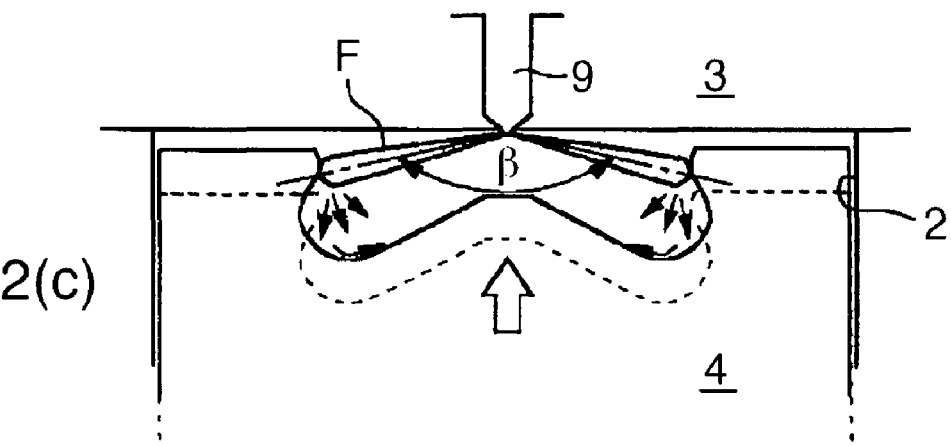

FIG. 2(a) shows the condition at the fuel injection start timing (the instant the injector 9 is turned ON), at this time, the fuel is not injected from the injector 9, and the piston 4 is positioned comparatively low. Then, as shown in FIG. 2(b), after some time period has passed, the piston 4 rises for a little, and fuel F starts to be dispersed to the outside in the radial direction from the injector 9. However, at that point of time, the fuel F has not yet reached the cavity 11 of the piston 4. Then, as shown in FIG. 2(c), when a further period of time has passed, the fuel F impacts top portion of the side wall of the cavity 11. At this time, the injection timing set in the present embodiment is the injection timing so that all the fuel F is supplied within the cavity 11. Conversely, an injection timing for which part of the fuel that impacts the cavity 11 is reflected upwards and adheres to the bottom surface of the cylinder head 3 is not set in the present embodiment.

Normally, in premixed combustion compression, auto-ignition of the premixed fuel-air mixture occurs depending upon the temperature, pressure and the like within the cylinder, so it is difficult to control the ignition timing. Therefore, in the present embodiment, the EGR ratio is controlled in order to control the ignition timing. From the output and fuel consumption point of view, it is desirable that the ignition timing is near compression top dead center, but in premixed combustion, the fuel is injected earlier than with normal diffuse combustion, so depending on the conditions within the cylinder, there is a possibility that ignition will occur before reaching near the compression top dead center. Therefore, in EGR control, the target EGR ratio of the inlet gas (inlet air+EGR gas) supplied within the cylinder is set higher than for normal combustion, so that the ignition timing is delayed as the injection timing is early, so that ignition is controlled to occur near compression top dead center. Specifically, the target EGR ratio is set to 50% or greater.

Figure 13:
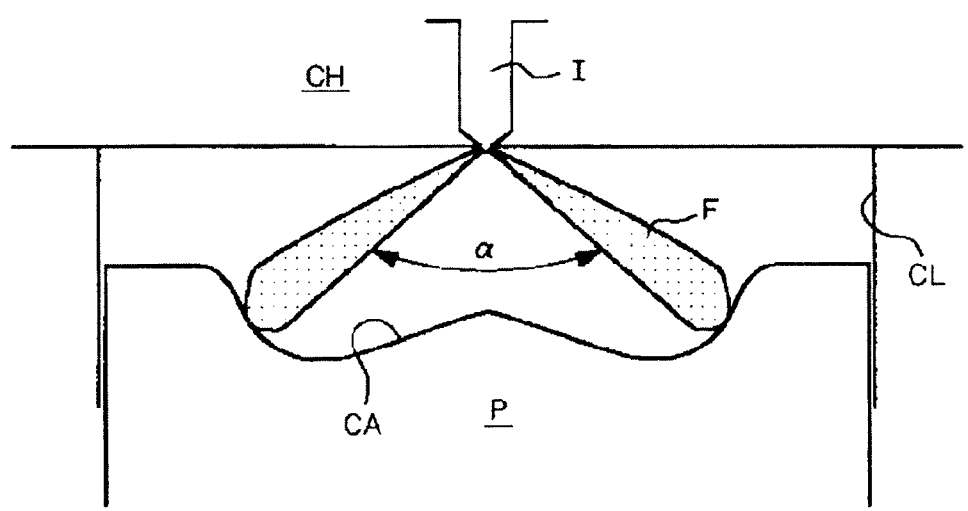
FIG. 13 is a schematic diagram showing a conventional open type engine.

Also, in a conventional engine that implements premixed combustion, as shown in FIG. 13, a comparatively narrow injection angle α is combined with a shallow dish shaped or open type cavity CA, so that even if the injection timing is advanced to earlier, the fuel injected from the injector is certain to reach the cavity CA. In contrast to this, when an injector 9 having a normal injection angle β (within the range of 140° to 165°) is used, as in the present embodiment, the injection angle is wider than the conventional case, and the range within which the injection timing can be advanced is smaller than the conventional engine. Hence, the fuel is injected under conditions in which the pressure and temperature within the cylinder are comparatively high, so there is a risk of ignition before compression top dead center. However, in the present embodiment, as stated above, the target EGR ratio is set to a comparatively high value, so it is possible to delay the ignition timing and to control it to near the compression top dead center.

In the present embodiment, to control the EGR ratio, a map of the target values of the inlet air quantity corresponding to the engine operating conditions are stored in advance in the ECU 26 (see FIG. 6), and the ECU 26 controls either one or both of the EGR valve 21 and the inlet air throttle valve 23 so that the actual inlet air quantity approaches the target inlet air quantity, in accordance with this map. The map of target values of inlet air quantity is determined in advance so that the actual EGR ratio becomes the target EGR ratio when the inlet air quantity is controlled in accordance with this map. Here the inlet air quantity is a value that corresponds to the EGR ratio. This is because for a constant inlet flow rate, if the inlet air quantity is increased the EGR ratio decreases, and if the inlet air quantity is decreased the EGR ratio increases. The inlet gas quantity is determined by the engine rotation speed, so it is possible to calculate the EGR ratio from the engine rotation speed and the inlet air quantity.

In this way, by reducing the oxygen concentration in the premixed fuel-air mixture by implementing a comparatively large quantity of EGR with the EGR device 19, it is possible to ensure a sufficient premixing period. Therefore, it is possible to ensure the implement of premixed combustion in the engine according to the present embodiment, in which the fuel injection start timing cannot be very early. Also, the ignition timing is controlled to be the appropriate timing (near the piston compression top dead center) by controlling the EGR ratio (in the present embodiment, the inlet air quantity is controlled), so it is possible to ensure sufficient fuel consumption and output. Furthermore, by reducing the oxygen concentration in the premixed fuel-air mixture by implementing a large quantity of EGR, it is also possible to reduce the NOx in the exhaust gas.

Figure 4:
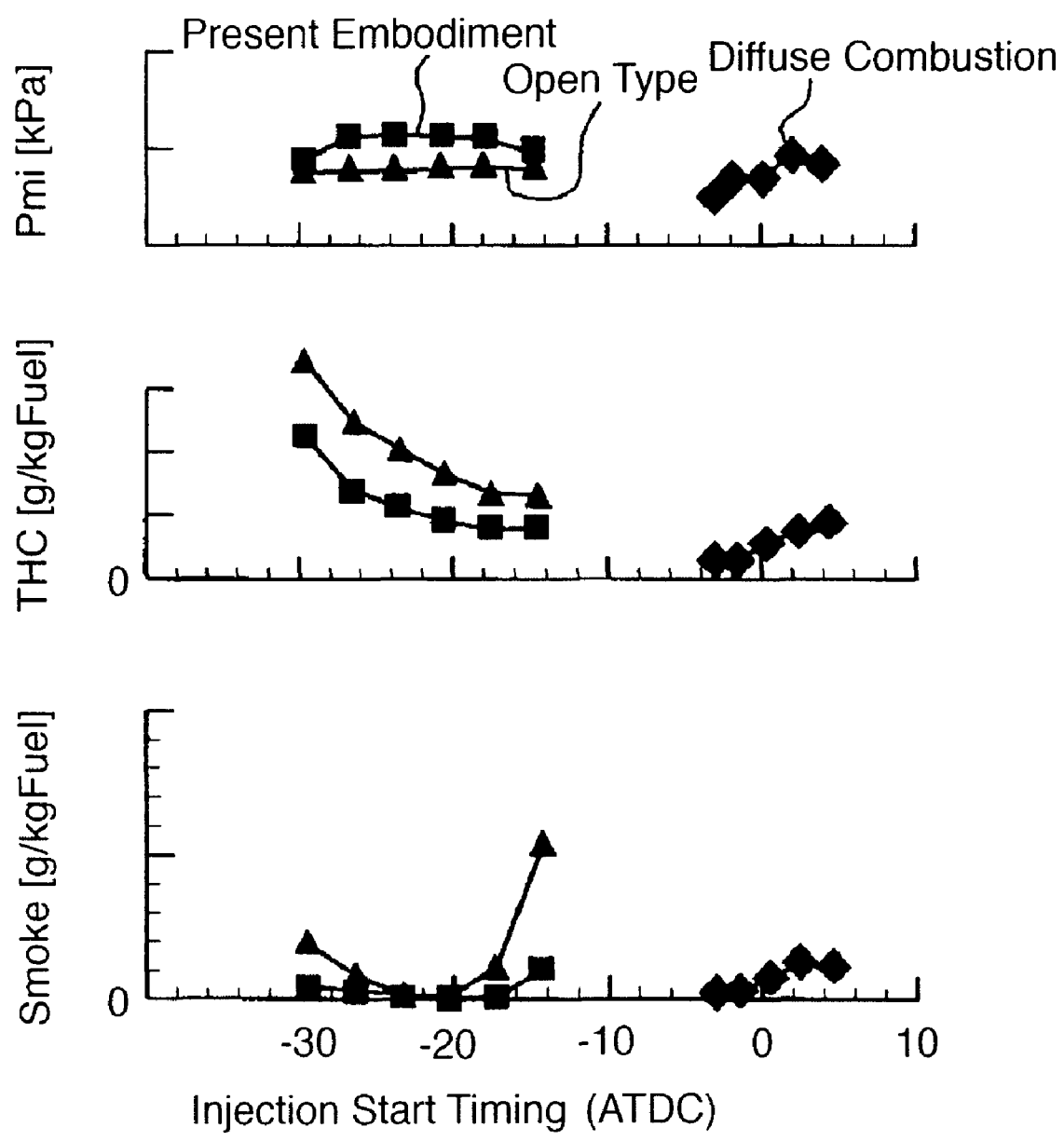
FIG. 4 is a graph showing the results of a comparison between a diesel engine according to the present embodiment and a conventional open type engine.

FIG. 4 shows measured results for mean effective pressure Pmi, THC emission quantity, and smoke emission quantity for the engine according to the present embodiment and an engine using an open-type cavity CA and an injector I with a narrow injection angle α (hereafter referred to as the open-type engine) as shown in FIG. 13.

The horizontal axis in the figure is fuel injection start timing (ATDC), the lines joining the square points in the figure show the measured results for the engine according to the present embodiment, and the lines joining the triangular points show the measured results for the open type engine. The lines joining the diamond shaped points are the measured results for a normal diesel engine with diffuse combustion which are shown for reference.

As can be seen from the figure, the mean effective pressure Pmi (which corresponds to the engine output) for the engine according to the present embodiment is greater than that of the open type engine for all injection start timings.

Also, for the quantity of THC or smoke emissions, for all injection start timings, the emissions were the same or lower than those of the open type engine. A point worthy of special mention is that, for the engine according to the present embodiment, the quantity of smoke emissions is low over a wide range of injection start timings. This means that there is a lot of flexibility in setting the injection start timing. In other words, the range of injection start timings in the open type engine for which the quantity of smoke emissions is low, is narrow (−26° to −18° ATDC), so the possible setting range of the injection timing is narrow, however in the engine according to the present embodiment there is a wide range of injection timings for which the quantity of smoke emissions is low (−30° to −14° ATDC), so the injection timing may be freely set within this wide range.

It is believed that the reason why the engine according to the present embodiment is superior with respect to both output and gas emissions compared with the open-type engine is the effect of the reentrant type cavity 11. In other words, with the reentrant type cavity 11, combustion of virtually all the fuel occurs within the cavity 11, and this is thought to result in improved output. Also, with a reentrant cavity 11 it is possible to maintain for a long time within the cavity 11, the swirl that is formed within the cavity 11, so sufficient dilution and homogenization occurs due to the premixing of the premixed fuel-air mixture. This is considered to lead to the improvement in the exhaust gas. Further, another advantage of the reentrant cavity 11, namely high squish formation, is also considered to contribute to the improvement in the exhaust gas.

Figure 5:
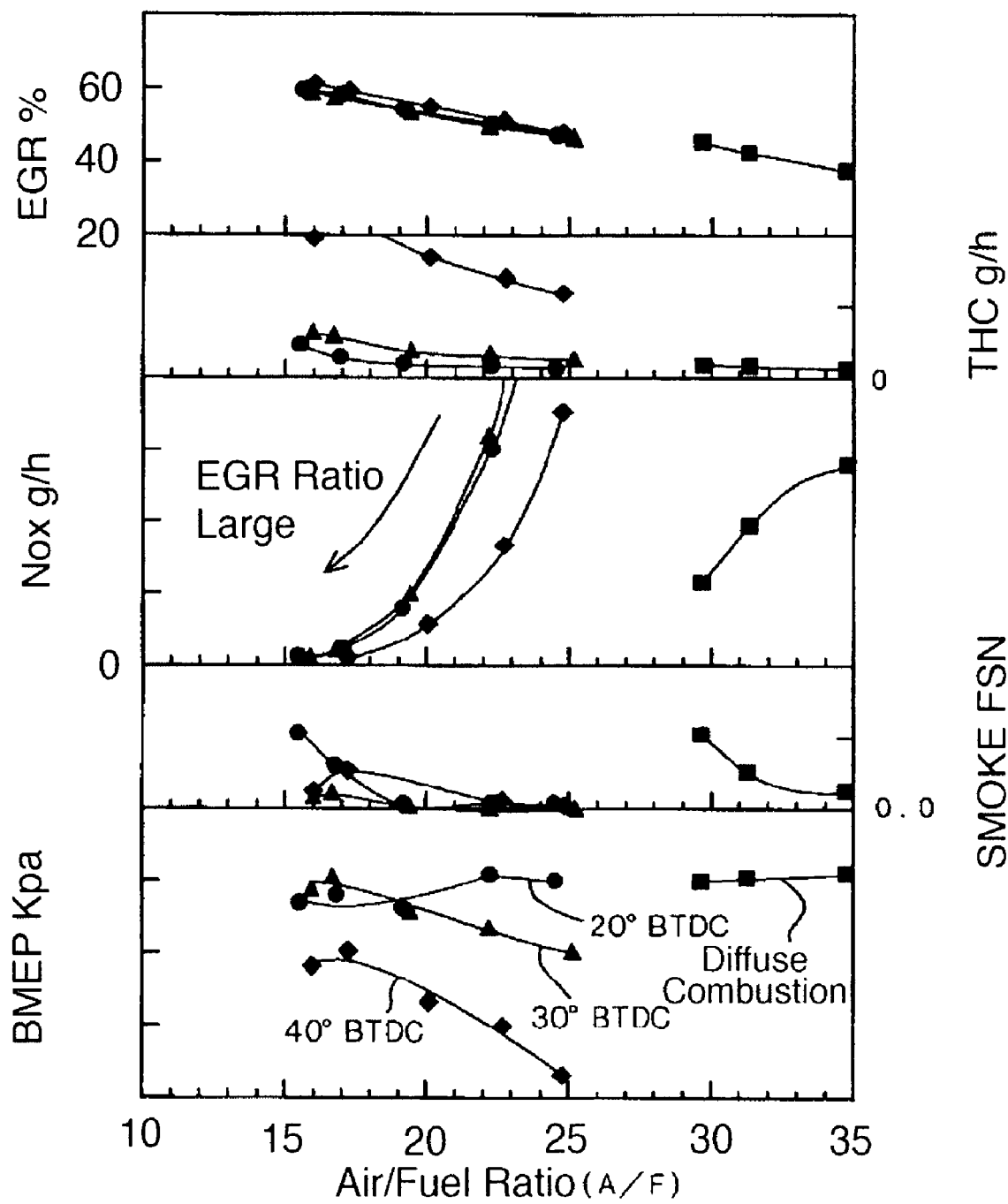
FIG. 5 is a graph showing the results of measurements of the changes in each value corresponding to variations in the injection timing in premixed combustion.

FIG. 5 shows the measured results for THC emission quantity, NOx emission quantity, smoke emission quantity, and brake mean effective pressure BMEP (which corresponds to the output) when the EGR ratio is varied between about 40 to 60%, for three types of settings for the fuel injection start timing in an engine according to the present embodiment.

The horizontal axis of the figure is the air to fuel ratio (A/F) of the premixed fuel-air mixture, the lines connecting the circular points in the figure are injection timing 20° BTDC, the lines connecting the triangular points are injection timing 30° BTDC, and the lines connecting the diamond shaped points are injection timing 40° BTDC. The lines connecting the square points are the measured results for a normal diesel engine with diffuse combustion which are shown for reference.

As can be seen from the figure, the THC emission quantity is virtually the same for injection start timing 20° BTDC and 30° BTDC, and only for injection timing 40° BTDC is the THC emission quantity greatly increased. Also, the brake mean effective pressure BMEP is virtually the same for injection timing 20° BTDC and 30° BTDC, and only for injection timing 40° BTDC is the brake mean effective pressure BMEP greatly reduced.

In this way, when the injection timing is 40° BTDC, the THC emission quantity and the output are both worse than for injection timing 20° BTDC and 30° BTDC; it is considered that this is caused by a part of the injected fuel being dispersed from the cavity 11 to the outside.

In other words, in the case of injection timing 20° BTDC and 30° BTDC, all the injected fuel enters the cavity 11, so both THC emission quantity and output are good, and no large difference can be seen between the two, but in the case of injection timing 40° BTDC, the injection timing is too early so a part of the fuel is dispersed outside the cavity 11, and this fuel adheres to the bottom surface of the cylinder head 3 and elsewhere, which results in THC emissions. Also, the fuel that is dispersed outside the cavity 11 cannot burn within the cavity 11, so it may be considered that this results in reduced output.

Next, focusing on the relationship between EGR ratio and exhaust gas and output in FIG. 5, it can be seen that for all injection timings, the higher the EGR ratio the lower the NOx emission quantity. This is because the oxygen concentration in the premixed fuel-air mixture is reduced by the large quantity of EGR. As can be seen from the figure, in the case of fuel injection timing 20° BTDC and 30° BTDC, if the EGR ratio is 50% or greater, the NOx emission quantity is reduced to virtually zero. For THC emission quantity, smoke emission quantity, and brake mean effective pressure BMEP, no clear correlation with the EGR ratio was observed.

From the measured results in FIG. 5, it can be seen that with an engine according to the present embodiment in which the injection timing is set so that all the fuel enters the cavity 11 and that has a large quantity of EGR, superior exhaust gas characteristics and output can be obtained.

The engine according to the present embodiment implements normal diffuse combustion in the high load part. The engine according to the present embodiment uses a reentrant type cavity 11 and a normal injector 9 with a comparatively wide injection angle β, which are suitable for diffuse combustion, so good combustion can be obtained when implementing diffuse combustion. In other words, when the fuel is injected near compression top dead center to implement diffuse combustion, the injected fuel impacts the side wall of the cavity 11, same as for a normal diesel engine, so there is no large scale generation of smoke or the like. Also, because of the reentrant cavity 11, the swirl formed within the cavity 11 can be kept within the cavity 11, so superior exhaust gas characteristics can be obtained.

Therefore, according to the engine of the present embodiment, in the low load region, good premixed combustion can be implemented as stated previously, and in addition when the combustion is switched to diffuse combustion, good combustion can also be obtained in the high load region.

Here, the injection angle β of the injector 9 is set as follows in order to positively implement good diffuse combustion. In other words, the injection angle β is such that the fuel injected near the piston 4 compression top dead center reaches the inner wall of the cavity on the outside in the radial direction of the lowest position J (see FIG. 2(a)) of the cavity 11. If the injection angle β of the injector 9 is made narrower until the angle is just within the range to satisfy this condition, good diffuse combustion and premixed combustion can suitably be compatible, as well as when implementing premixed combustion, the fuel injection start timing can be advanced to relatively earlier.

In the engine according to the present embodiment, it is desirable to use a high swirl type cylinder head 3 or air inlet port 5, to further promote mixing of the premixed fuel-air mixture. For example, a swirl generation device may be provided in the air inlet port 5.

Also, an external EGR device in which a part of the exhaust gas within the exhaust pipe 13 is recirculated to the air inlet pipe 12 has been indicated as the EGR device in the embodiment described above, however the present invention is not limited on this point, and an internal EGR device in which exhaust gas is recirculated to the combustion chamber 10 by controlling the opening and closing of the exhaust valve 8 or the inlet air valve 7 may be used.

According to the present embodiment, as was explained in connection with FIG. 3, two control modes are provided: a premixed injection mode that is implemented in the premixed region, and a normal injection mode that is implemented in the normal region. Also, during engine operation, the values of the actual engine rotation speed NE and the target fuel injection quantity Q each vary between the values for the premixed region and the values for the normal region, and when the switching line A is crossed over, the control mode is switched accordingly. Examples of switching points when accelerating and when decelerating are indicated by the points B and C respectively.

In the premixed injection mode, fuel injection is completed before compression top dead center, and the injection quantity and injection timing are controlled so that after the premixing period has passed, the injected fuel ignites near compression top dead center. Also, in the normal injection mode, the injection quantity and injection timing are controlled so that the injected fuel ignites near compression top dead center during the injection period.

Figure 6:
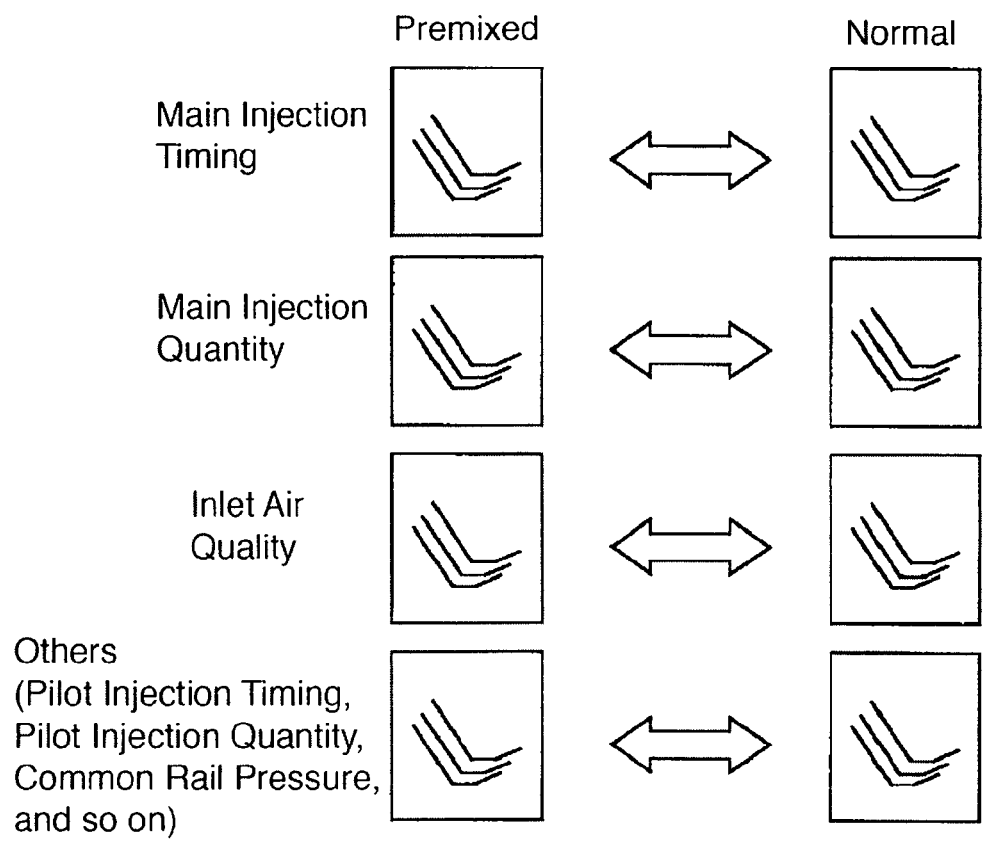
FIG. 6 shows a map of target values of each control parameter in the premixed injection mode and the normal injection mode.

As shown in FIG. 6, the target values of the respective control parameters of the premixed injection mode and the normal injection mode are set separately. In other words, maps of the target values of the control parameters (main injection timing, and so on) corresponding to one or more parameters that represent the engine operating condition (engine rotation speed, engine load, and so on) are prepared in advance for each of a plurality of different control parameters respectively. Furthermore, for the same control parameter, a map for premixed injection mode and a map for normal injection mode are prepared. In the present embodiment, in the premixed injection mode, a main injection is carried out only once, but in normal injection mode, fuel injection is carried out twice: a pilot injection and a main injection, and this will be described in detail later. The control parameters in the present embodiment include main injection quantity, main injection timing, pilot injection quantity, pilot injection timing, inlet air quantity, and common rail pressure. However, for example, various other parameters may be adopted, such as turbocharge pressure or movable vane degree of opening in an engine that uses a variable capacity turbocharger.

In this way, two sets of target values are separately and independently set in respect of the same control parameter, so immediately after switching the control mode, the target values can vary greatly even though engine operating conditions are almost the same. If the target values are changed suddenly and greatly (in other words, in a step-like manner) when switching control modes, the actual values will also suddenly and greatly change accordingly, so it is possible that combustion noises or torque fluctuations will be generated, or the exhaust gas may deteriorate during the transition.

Therefore, to avoid these problems, it is desirable that the target values are gradually changed when the control mode is switched. This is executed by the control device according to the present embodiment, and the situation is as shown in FIG. 7. In the example shown in the figure, at the time t1, the control mode is switched from normal injection mode to premixed injection mode, then later at time t3, the control mode is switched from the premixed injection mode to the normal injection mode. During this switch the target values of each control parameter are changed from the values of one control mode (for example, V1) to the values of the other control mode (for example, V2). However, during this change the one value is gradually changed into the other value over a period of time. In other words, it is desirable that the change from one value to the other value is not an instantaneous sudden step-like change, but a gentle sloping-like manner conducted over a period of time. This type of change can be achieved by for example performing a rounding process on a step input that is the basis, and taking the output to be the target value. By gradually changing the target values in this way, sudden changes in the actual values can be prevented, and it is possible to prevent combustion noises, torque fluctuations, and deterioration of the exhaust gas during the transition.

In addition, in the present embodiment, when switching control modes, delay control is carried out for the change in target values of the fuel system relative to the changes in target values of the gas inlet system. The target values of the fuel system referred to here are in the example shown in the figure, target main injection quantity, target main injection timing, target pilot injection quantity, target pilot injection timing, and target common rail pressure, and the target value for the gas inlet system in the example shown in the figure is target inlet air quantity.

As shown in FIG. 7, after starting to change the target value associated with the gas inlet system, the target values associated with the fuel system start to change. For example, at time t1 when the control mode is changed from the normal injection mode to the premixed injection mode, the target inlet air quantity starts to change, then when the target inlet air quantity reaches a predetermined threshold value MAF1 (time t2), the target main injection quantity, the target main injection timing, the target pilot injection quantity, the target pilot injection timing, and the target common rail pressure start to change. In this way, execution of the change in the target values of the fuel system is delayed only by $\Delta t1=t2-t1$ relative to the change in target value of the gas inlet system.

In the same way, at time t3, when the control mode is switched from the premixed injection mode to the normal injection mode, first the target inlet air quantity starts to change, then when the value of the target inlet air quantity reaches a predetermined threshold value MAF2 (time t4), the target main injection quantity, the target main injection timing, the target pilot injection quantity, the target pilot injection timing, and the target common rail pressure start to change. In this way, execution of the change in the target values of the fuel system is delayed only by $\Delta t3=t4-t3$ relative to the change in target value of the gas inlet system.

The reason for doing this is a difference in responsiveness which the change in the actual value of the gas inlet system is delayed relative to the actual values of the fuel system. In other words, if the target inlet air quantity is changed, and assuming that the degree of opening of the air inlet throttle valve 23 and the EGR valve 21 is instantly changed corresponding to this target value, there is a certain distance and capacity between the air inlet throttle valve 23 and the EGR valve 21 and the combustion chamber 10 within the cylinder, so a fixed period of time passes before the actual EGR ratio of the inlet gas in the combustion chamber 10 changes to correspond to the target value. Also the target EGR ratio in the premixed region is set to the comparatively high value of 50% or higher, and in contrast the target EGR ratio in the normal region is about 30% or less. Therefore, when moving between regions the change in target EGR ratio is large, and this is also a reason for the delay in the response of the actual EGR ratio. On the other hand, for the values of the fuel system, if a signal corresponding to the target value is sent to the injector 9, the change is instantaneous. Also, changes of the common rail pressure can be made comparatively rapidly. Therefore, the changes in the values for the fuel system which can be changed rapidly are delayed relative to the value for the gas inlet system, as in the present embodiment, so that after waiting for the actual change in the actual EGR ratio in the combustion chamber 10, the values for the fuel system are changed, so it is possible to realize the required form of combustion. In particular, the EGR ratio is an important parameter in premixed combustion, so it is important to carry out control in accordance with the actual EGR ratio.

FIG. 8 shows the variation in the values of the air intake system corresponding to variations in the engine load. In each of the graphs (a) to (c), the horizontal axis is the engine load. The vertical axes are (a) the inlet air quantity, (b) the EGR ratio, and (c) the air to fuel ratio (A/F). In each graph, the solid line is the value in normal injection mode, and the broken line is the value in the premixed injection mode. The lines in (a) show target values, and the lines in (b) and (c) show the actual values.

When the engine load increases, such as when accelerating, each value varies in accordance with the thick arrowed line E. While the premixed injection mode is implemented, each value changes by moving to the right along the broken lines. Then when the switching point B, is reached, each value changes to the value on the solid line, which are the values for the normal injection mode, and thereafter each value changes by moving to the right along the solid line. At the switching point B each value is changed as shown at E1, but as stated before in the present embodiment, the control is implemented to gradually change, so the changes are comparatively slow.

As shown in (b), in the premixed injection mode, the EGR ratio is 50% or greater, and just before the switching point B is close to 50%, with the value becoming larger as the load becomes lower. Then when switching to the normal injection mode, the EGR ratio is greatly reduced to 30% or less, just after the switching point B is near 30%, with the value becoming smaller as the load becomes higher. To change the EGR ratio in this way, the target EGR ratio is set, and in the present embodiment, the target inlet air quantity is set as in (a). In (a), the value of the inlet air quantity increases as the load increases. This corresponds to the reducing EGR ratio. Then, when switching from the premixed injection mode to the normal injection mode, the inlet air quantity changes to a larger value.

The variation in A/F corresponding to the variation in EGR ratio as stated before is shown in (c). In the premixed injection mode, A/F has a value greater than the stoichiometric ratio (theoretical air to fuel ratio: about 14.5) (in other words, on the lean side), and gradually reduces as the engine load increases, and at the switching point B, it reaches near the stoichiometric ratio (in other words, a value slightly larger than the stoichiometric ratio, for example 15). This value is the limit for implementing the premixed combustion. Then when switching to the normal injection mode at the switching point B, A/F is again increased, then after decreasing for a while maintains a virtually constant value. As shown in the figure, there is a smoke generation region within a fixed range of A/F that is higher than the stoichiometric ratio. In the normal injection mode, A/F is virtually constant at a value that is slightly higher than the smoke generation region, to avoid the smoke generation region. In the figure, there is a part of the premixed injection mode that passes through the smoke generation region, but in reality, the fuel is uniformly premixed for combustion, and coupled with the effect of the reentrant cavity described above, there is no problem with smoke generation. Each target value is set so that the variation in A/F is realized as described above.

When the engine load decreases during decelerating, the changes are the opposite to those described above.

FIG. 9 shows the variation in injection quantity and injection timing when switching control modes. Here, (a) is the normal injection mode, (d) is the premixed injection mode, and (b) and (c) show the transition states between these modes. As can be understood from the figure, in the premixed injection mode, the main injection is executed only once, and in the normal injection mode, two injections are executed: the pilot and the main injections.

A characteristic here is that the injection quantity and injection timing of the main injection in the premixed injection mode (hereafter also referred to as the premixed main injection) and the injection quantity and injection timing of the pilot injection in the normal injection mode (hereafter also referred to as the normal pilot injection) are mutually related, and there is a transition between the two. In other words, for both the premixed main injection and the normal pilot injection, the injection timing is before compression top dead center TDC, and their timing is comparatively close to each other. Therefore, the transition can be carried out smoothly by controlling in association with them, and this is desirable as it can be treated as a single value for control. In fact, in the present embodiment, the injection timing of the premixed main injection and the normal pilot injection is treated as a single or a common control parameter.

When switching from the normal injection mode to the premixed injection mode by going from (a) towards (d), the injection timing and the injection quantity of the normal pilot injection gradually change to those for the premixed main injection, and although the injection timing of the main injection in the normal injection mode (hereafter referred to as the normal main injection) is fixed to near the compression top dead center, the injection quantity gradually reduces, and ultimately becomes zero. Conversely, when switching from the premixed injection mode to the normal injection mode by going from (d) towards (a), the injection quantity and injection timing of the premixed main injection are gradually changed to those for the normal pilot injection, and the normal main injection which did not exist in the initial state gradually appears, the injection quantity gradually increases while the injection timing remains fixed at near the compression top dead center, and ultimately reaches the target value in the normal injection mode.

Regarding the relationship between the normal pilot injection and the premixed main injection, normally the injection quantity in the normal pilot injection is smaller than the injection quantity in the premixed main injection. Regarding the injection timing, in the example shown in the figure, the injection timing of the normal pilot injection is earlier than the injection timing of the premixed main injection, but later is also possible. Many forms of the normal pilot and main injections are possible, for example, the pilot injection may be executed immediately prior to the main injection, and the ignition created by the pilot injection can be continued by the combustion of the main injection fuel, or the pilot injection may be carried out comparatively early, the injected fuel is uniformly premixed, then the main injection is carried out, and so on. In the latter case, early pilot injection may be applied when the maximum heat generation rate is 60 kJ/s or less, as disclosed by the present applicants in Japanese Patent Application Laid-open No. 2003-148222.

Figure 14:
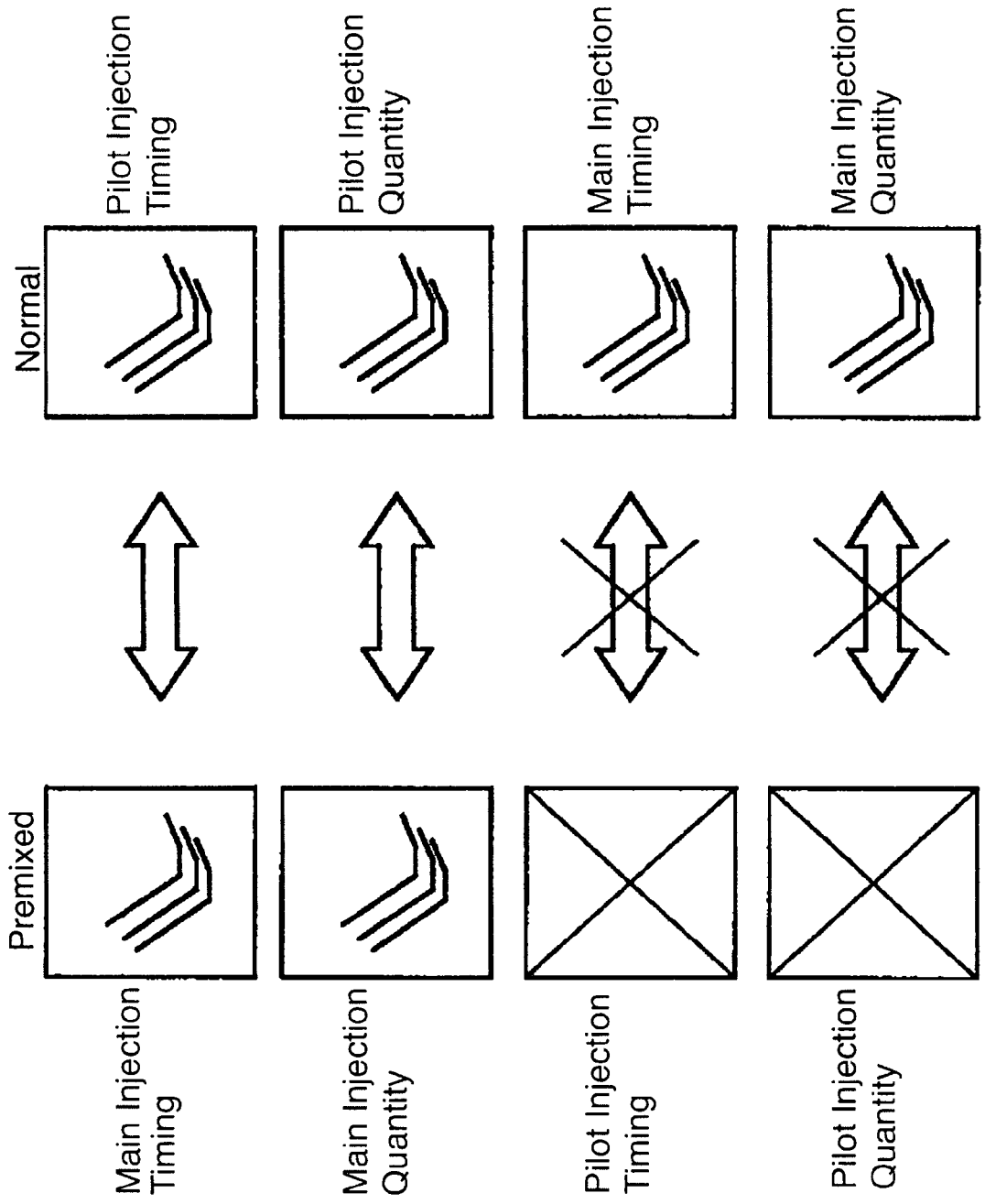
FIG. 14 is a diagram showing the relationship between maps for the case relating the premixed main injection and the normal pilot injection.

If the premixed main injection and the normal pilot injection are related in this way, the relationship between maps shown in FIG. 6 is as shown in FIG. 14. In other words, the injection timing and injection quantity of the premixed main injection and the injection timing and injection quantity of the normal pilot injection are related respectively, and transition of target values between these is carried out. In contrast to this, there is no pilot injection in the premixed injection mode, so there is no injection timing and injection quantity calculation map. When the control mode is switched from the premixed injection mode to the normal injection mode, the target value of the injection timing is determined from a main injection timing calculation map of the normal injection mode corresponding to the engine operating conditions at that time. On the other hand, a provisional target value of the main injection quantity is determined from a main injection quantity calculation map of the normal injection mode corresponding to the engine operating conditions at that time, and the final target value is gradually approached to the provisional target value.

Figure 10:
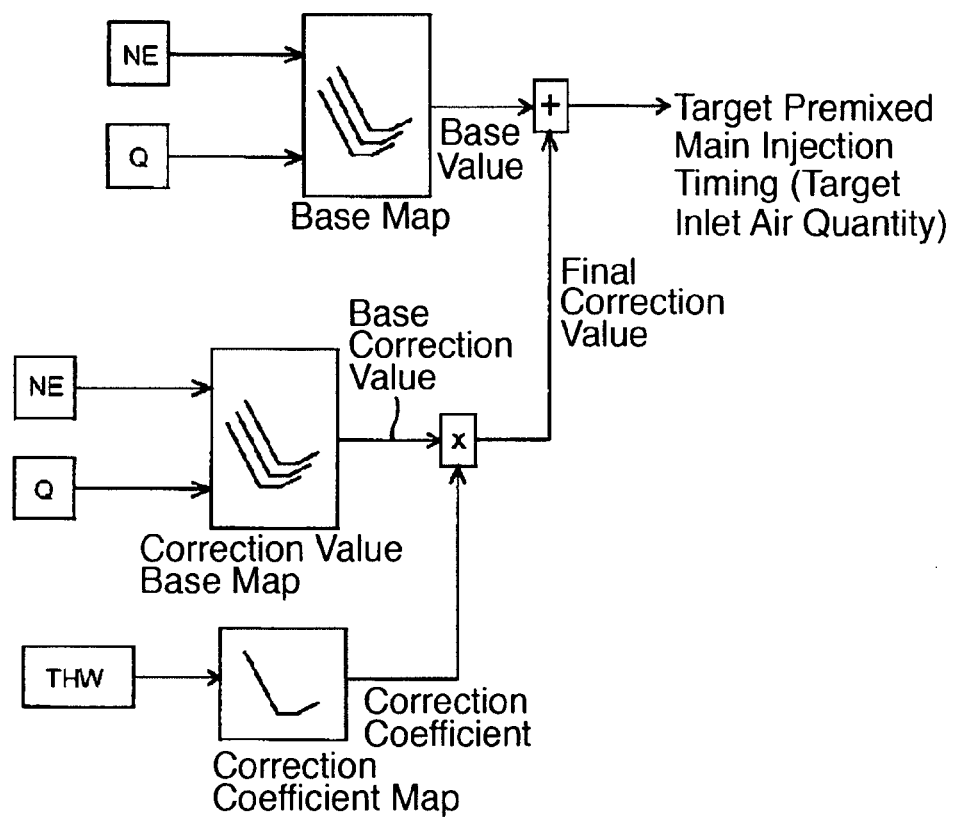
FIG. 10 is a diagram showing the logic for determining the target premixed main injection timing.

FIG. 10 shows the logic for determining the target injection timing of the premixed main injection. As stated before, in the present embodiment, the injection timing of both the premixed main injection and the normal pilot injection is treated as the same control parameter, so this logic can also be used to determine the target injection timing of the normal pilot injection. Also, in the present embodiment, the target inlet air quantity is determined using the same logic. This logic is executed by the ECU 26.

As shown in the figure, the base value of the target premixed main injection timing is first determined from the actual engine rotation speed NE and the target fuel injection quantity Q, using a base map. On the other hand, the base correction value is determined from the actual engine rotation speed NE and the target fuel injection quantity Q using a correction value base map. Then further, a correction coefficient is determined from the engine water temperature THW (this is a substitution value of the engine temperature, oil temperature or the like may also be used) measured by a water temperature sensor (which is not shown in the drawings), using a correction coefficient map. This correction coefficient is multiplied by the base value of the correction value to determine the final correction value, and by adding this final correction value to the base value of the target pilot injection timing, the final target premixed main injection timing is obtained. In other words, the target premixed main injection timing (in other words, the target normal pilot injection timing) and the target inlet air quantity are corrected by this logic.

When the engine has not completely warmed up, the temperature within the cylinder and the EGR gas cooling efficiency of the EGR cooler 22 are different from the temperature and efficiency after the engine has warmed up. Also, the EGR ratio and the $O_2$ concentration vary with the state of warming up of the engine. In particular, in premixed combustion, it is important to accurately control the $O_2$ concentration and EGR ratio (or the inlet air quantity) to the required values. This is the reason for the correction based on the engine temperature explained here.

It is preferable that this type of correction for the engine warm up condition and the EGR cooler condition (including deterioration and the like) is carried out based on detected values of the temperature and the $O_2$ concentration of the actual inlet air drawn into the cylinder.

Figure 11:
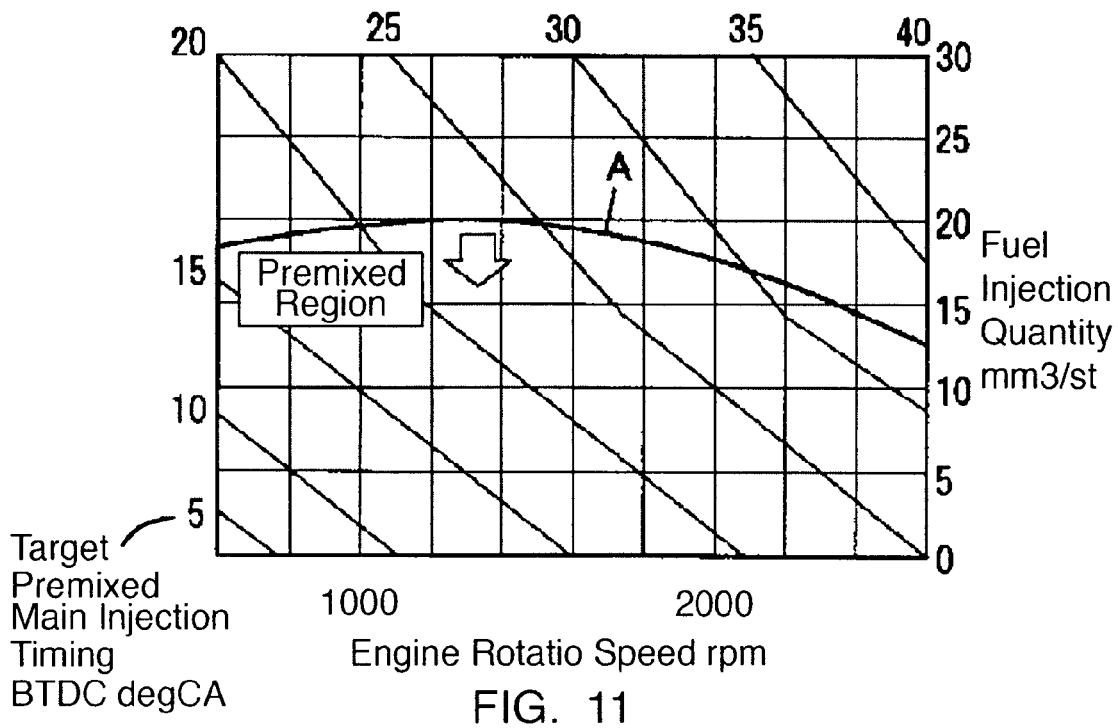
FIG. 11 is a diagram that shows more specifically a map for determining the target premixed main injection timing.

FIG. 11 shows more specifically a map for determining the target premixed main injection timing. The horizontal axis is the engine rotation speed (rpm), the vertical axis is the fuel injection quantity ($mm^3$/st), and only the low load side (lower side) of the switching line A is used. Also, in practice, the region above the fuel injection quantity corresponding to idling (in the present embodiment 5 $mm^3$/st) is used, as the fuel injection quantity does not become zero, except when cutting off the fuel or similar. As can be understood from the figure, the premixed main fuel injection is set within the range 5 to 35° before top dead center, and as the engine rotation speed and fuel injection quantity (equivalent to the engine load) increase, the fuel injection timing tends to become earlier. Also, when the engine rotation speed is constant, the injection timing becomes earlier as the load increases. This is because, as the injection quantity increases, it is necessary to increase the premixing period. On the other hand, when the fuel injection quantity is constant, the injection period becomes earlier as the rotation speed increases. This is because, as the rotation speed increases, the piston speed also increases, and to ensure the premixing period it is necessary to start injection earlier.

Figure 12:
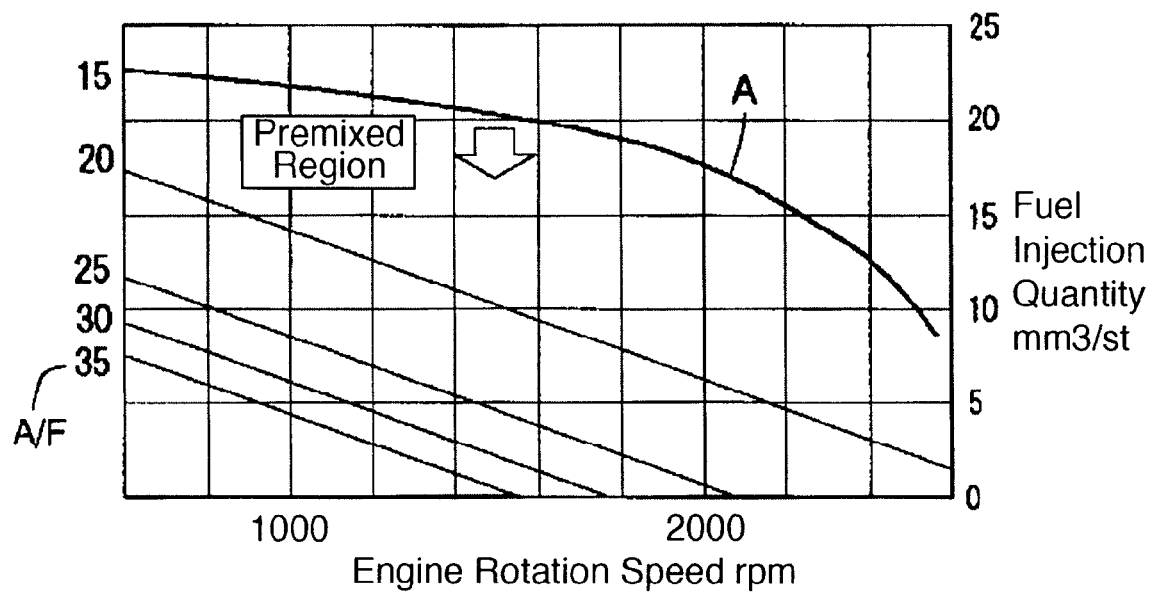
FIG. 12 shows the test results for actual A/F in the premixed region.

FIG. 12 shows the test results for actual A/F in the premixed region. The values of A/F shown here are values calculated from actual inlet air quantity, and are not directly measured values of A/F within the cylinder. As before, the horizontal axis is engine rotation speed (rpm), and the vertical axis is fuel injection quantity ($mm^3$/st). Only the low load side (lower side) of the switching line A and the high load side (upper side) of the idling injection quantity are effective. At the position of the switching line A, A/F is about 15 which is the limit for premixed combustion, and the value becomes larger further down towards the low load side, indicating a tendency towards leanness. At the lowest load side, the maximum value exceeds 35.

As explained above, according to the diesel engine control device of the present invention, switching between premixed combustion and diffuse combustion can be smoothly and properly carried out and change in combustion noise and torque shock can be prevented when switching.

The embodiments of the present invention are not limited to the embodiment described above, and various other embodiments may be adopted. For example, in the above embodiment, the inlet air quantity was used as a parameter related to the EGR ratio, but the value of EGR ratio may be directly used. In other words, the target EGR ratio itself is set in advance, the actual EGR ratio is detected, and the actual EGR ratio is controlled so that it approaches the target EGR ratio. Also, in the normal injection mode, the pilot injection is not absolutely necessary, and the main injection alone may be used. Conversely, a multi-stage injection in which the pilot injection is executed a plurality of times may be used.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A diesel engine control device for controlling the injection quantity and injection timing of fuel injected into a cylinder of a diesel engine comprising a reentrant-type cavity provided in a top portion of a piston, wherein are provided two control modes of: a normal injection mode in which the injection quantity and injection timing are controlled so that the injected fuel ignites near compression top dead center during an injection period, and in which a pilot injection and a main injection are carried out; and a premixed injection mode in which the injection quantity and injection timing are controlled so that fuel injection is completed before compression top dead center and the injected fuel ignites near compression top dead center after a premixing period, and in which only a main injection is carried out;

wherein an injection angle and the injection timing are set so that the injected fuel enters the cavity and burns in the cavity in both control modes;

wherein target values of control parameters are set in advance separately for each control mode, wherein the diesel engine control device comprises change means for gradually changing the target values of one control mode into the target values of the other control mode when switching from one control mode to the other control mode, and wherein the injection timing of the main injection in the normal injection mode is fixed when switching from one control mode to the other control mode.

2. The diesel engine control device according to claim 1, comprising:

an EGR device that implements EGR to recirculate a part of exhaust gas to a gas inlet side, and that includes a valve to change the EGR ratio; and EGR control means that controls the valve so that the actual EGR ratio approaches the target EGR ratio, wherein the target values include at least the target fuel injection quantity, the target fuel injection timing, and the target EGR ratio, and the change means comprises delay means that starts to change the target fuel injection quantity and the target fuel injection timing after starting to change the target EGR ratio when switching from one control mode to the other control mode.

3. The diesel engine control device according to claim 2, wherein the valve includes at least an inlet air throttle valve provided in an engine inlet air passage, the EGR control means controls an inlet air quantity to control the EGR ratio, and controls at least the inlet air throttle valve so that the actual inlet air quantity approaches the target inlet air quantity, and the delay means starts to change the target fuel injection quantity and the target fuel injection timing after starting to change the target inlet air quantity when switching from one control mode to the other control mode.

4. The diesel engine control device according to claim 2, wherein in the premixed injection mode, the target EGR ratio is set to 50% or greater.

5. The diesel engine control device according to claim 2, comprising means for correcting the target EGR ratio based on the engine temperature.

6. The diesel engine control device according to claim 2, comprising a common rail that stores the fuel before injection under high pressure, and means for controlling common rail pressure which is the pressure of the fuel within the common rail, the target values further comprise the target common rail pressure, and the delay means further starts to change target common rail pressure after starting to change the target EGR ratio when switching from one control mode to the other control mode.

7. The diesel engine control device according to claim 1, wherein, in the normal injection mode, a small quantity pilot injection and a large quantity main injection are carried out, and in the premixed injection mode, only a main injection is carried out;

the target values comprise at least the target pilot injection quantity, the target pilot injection timing, the target main injection quantity, and the target main injection timing in the normal injection mode, as well as the target main injection quantity and the target main injection timing in the premixed injection mode;

the target pilot injection quantity and the target pilot injection timing in the normal injection mode are associated with the target main injection quantity and the target main injection timing in the premixed injection mode respectively; and when switching from one control mode to the other control mode, the change means gradually changes between the target pilot injection quantity in the normal injection mode and the target main injection quantity in the premixed injection mode, and gradually changes between the target pilot injection timing in the normal injection mode and the target main injection timing in the premixed injection mode.

8. The diesel engine control device according to claim 7, comprising means for correcting the target main injection timing in the premixed injection mode based on an engine temperature.

9. The diesel engine control device according to claim 1, wherein the normal injection mode is implemented under higher engine loads than the premixed injection mode.

* * * * *